United States Patent
Xu et al.

(10) Patent No.: US 12,377,893 B2
(45) Date of Patent: Aug. 5, 2025

(54) TRAIN AUTONOMOUS CONTROL SYSTEM AND METHOD BASED ON TRAIN-TO-TRAIN COMMUNICATION

(71) Applicant: CASCO SIGNAL LTD., Shanghai (CN)

(72) Inventors: Haigui Xu, Shanghai (CN); Xiaoyong Wang, Shanghai (CN); Yiran Lu, Shanghai (CN)

(73) Assignee: CASCO SIGNAL LTD.

( * ) Notice: Subject to any disclaimer, the term of this patent is extended or adjusted under 35 U.S.C. 154(b) by 917 days.

(21) Appl. No.: 17/596,013

(22) PCT Filed: Oct. 19, 2020

(86) PCT No.: PCT/CN2020/121790
§ 371 (c)(1),
(2) Date: Dec. 1, 2021

(87) PCT Pub. No.: WO2021/238028
PCT Pub. Date: Dec. 2, 2021

(65) Prior Publication Data
US 2022/0227402 A1    Jul. 21, 2022

(30) Foreign Application Priority Data
May 29, 2020 (CN) .................. 202010477204.X

(51) Int. Cl.
*B61L 27/04* (2006.01)
*B61L 15/00* (2006.01)
(Continued)

(52) U.S. Cl.
CPC .......... *B61L 27/04* (2013.01); *B61L 15/0027* (2013.01); *B61L 15/0062* (2024.01); *B61L 27/20* (2022.01);
(Continued)

(58) Field of Classification Search
CPC ...... B61L 27/04; B61L 15/0027; B61L 27/20; B61L 27/30; B61L 27/70; B61L 99/002;
(Continued)

(56) References Cited

U.S. PATENT DOCUMENTS 11,731,675 B2 * 8/2023 Oh .................. B61L 27/20
246/167 R
2015/0375764 A1 12/2015 Rajendran et al.
(Continued)

FOREIGN PATENT DOCUMENTS

CN    105101094    11/2015
CN    107284471    10/2017
(Continued)

OTHER PUBLICATIONS

International Search Report issued in International Application No. PCT/CN2020/121790, Feb. 26, 2021, 5 pages.
(Continued)

*Primary Examiner* — Zachary L Kuhfuss
(74) *Attorney, Agent, or Firm* — HSML P. C.

(57) ABSTRACT

The present invention relates to a train autonomous control system and method based on train-to-train communication. The control system includes an automatic train supervision system ATS, an object controller OC, a train-mounted subsystem CC, a tag reader subsystem, a query transponder, and a data communication system DCS, the automatic train supervision system ATS is connected to the train-mounted subsystem CC, and the train-mounted subsystems CC of adjacent trains are in communication connection with each other, and the control system further includes a railside resource manager WRC, and the railside resource manager WRC is respectively connected to the automatic train supervision system ATS, the train-mounted subsystem CC, the object controller OC, the tag reader subsystem, and the
(Continued)

query transponder. Compared with the prior art, the present invention has the advantages of reducing a transmission link of data information over a network, improving operation efficiency of the system, and the like.

17 Claims, 4 Drawing Sheets

(51) Int. Cl.
| | |
|---|---|
| *B61L 27/20* | (2022.01) |
| *B61L 27/30* | (2022.01) |
| *B61L 27/70* | (2022.01) |
| *B61L 99/00* | (2006.01) |
| *H04W 4/42* | (2018.01) |
| *H04W 4/44* | (2018.01) |
| *B61L 23/14* | (2006.01) |
| *B61L 23/30* | (2006.01) |
| *B61L 25/02* | (2006.01) |

(52) U.S. Cl.
CPC ............ *B61L 27/30* (2022.01); *B61L 27/70* (2022.01); *B61L 99/002* (2024.01); *H04W 4/42* (2018.02); *H04W 4/44* (2018.02); *B61L 23/14* (2013.01); *B61L 23/30* (2013.01); *B61L 25/025* (2013.01); *B61L 2027/204* (2022.01); *B61L 2205/00* (2013.01)

(58) Field of Classification Search
CPC .... B61L 23/14; B61L 23/30; B61L 2027/204; B61L 2205/00; B61L 25/025; B61L 15/0062; H04W 4/42; H04W 4/44
See application file for complete search history.

(56) References Cited

U.S. PATENT DOCUMENTS

| | | | |
|---|---|---|---|
| 2019/0054940 A1* | 2/2019 | Gao | ................ B61L 25/04 |
| 2019/0111953 A1* | 4/2019 | Gao | .................. B61L 3/08 |
| 2019/0114914 A1* | 4/2019 | Gao | ............... B61L 25/025 |
| 2019/0144023 A1* | 5/2019 | Gao | ............... B61L 23/08 |
| | | | 701/19 |
| 2021/0237784 A1* | 8/2021 | Fiquet | ............. B61L 27/70 |
| 2021/0362757 A1* | 11/2021 | Oh | ............. B61L 15/0081 |

FOREIGN PATENT DOCUMENTS

| | | |
|---|---|---|
| CN | 111776013 | 10/2020 |
| JP | 2010-089639 | 4/2010 |

OTHER PUBLICATIONS

Written Opinion issued in International Application No. PCT/CN2020/121790, Feb. 26, 2021, 5 pages.
Li, et al., "Research on a New CBTC Signaling System Based on Train-to-train Communication", Electric Drive for Locomotives, Issue 4, 2018, pp. 50-53—Abstract only.

* cited by examiner

TRAIN AUTONOMOUS CONTROL SYSTEM AND METHOD BASED ON TRAIN-TO-TRAIN COMMUNICATION

FIELD OF TECHNOLOGY

The present invention relates a train autonomous control system and method, and in particular, to a train autonomous control system and method based on train-to-train communication.

BACKGROUND

Railside resource management and interval guard of a conventional urban rail transit communication-based train control (CBTC) system take a ground device as a core, and the ground device informs a train-mounted device through train-ground communication and interaction, to ensure operation safety of a train. However, an object of resource management in a conventional CBTC signal system is not the same as an object used actually, resulting in complex round-trip information exchange between devices and more links, affecting information transmission efficiency. In addition, there are a plurality of railside devices in the system, resulting in relatively high maintenance and implementation costs.

Recently, a train-to-train communication-based train control system has become a development direction of a next-generation train control system. With train-mounted as a control core, the train-mounted device performs path planning according to an operation task plan and applies to a railside object controller for railside resources, the railside object controller allocates the railside resources and informs the train-mounted device, and the train-mounted device obtains position information of an adjacent train by directly communicating with the adjacent train and actively calculates a movement authorization, to control safe and efficient operation of the train. However, this type of system is provided with a plurality of object controllers on a line. The object controllers manage and allocate the railside resources, and there are problems such as information exchange and transmission delay among the plurality of object controllers, restricting operation efficiency of the system to a certain extent.

SUMMARY

The purpose of the present invention is to provide a train autonomous control system and method base on train-to-train communication to overcome defects in the prior art, which reduces a transmission link of data information over a network and improves operation efficiency of the system.

The purpose of the present invention may be achieved through the following technical solutions.

A train autonomous control system based on train-to-train communication is provided, including an automatic train supervision system ATS, an object controller OC, a train-mounted subsystem CC, a tag reader subsystem, a query transponder, and a data communication system DCS, where the automatic train supervision system ATS is connected to the train-mounted subsystem CC, and the train-mounted subsystems CC of adjacent trains are in communication connection with each other, and the control system further includes a railside resource manager WRC, and the railside resource manager WRC is respectively connected to the automatic train supervision system ATS, the train-mounted subsystem CC, the object controller OC, the tag reader subsystem, and the query transponder.

The train-mounted subsystem plans an operation path according to a received operation task plan, and applies to the railside resource manager WRC for required railside resources, after obtaining the resources allocated by the WRC, the train-mounted subsystem autonomously controls a train to operate, and after the train-mounted subsystem no longer needs the resources, the train-mounted subsystem actively initiates an application for releasing the resources; and the train obtain position and operation range information of an adjacent train by directly communicating with the adjacent train, and actively calculates a movement authorization required for the operation.

Preferably, the train-mounted subsystem CC is connected to the automatic train supervision system ATS by a wireless network interface ITF1.

The train-mounted subsystem CC periodically sends position information of the train to the automatic train supervision system ATS, and the automatic train supervision system ATS sends a train operation plan and manual adjustment information to the train-mounted subsystem CC.

Preferably, the train-mounted subsystem CC is connected to the railside resource manager WRC by a wireless network interface ITF2.

The train-mounted subsystem CC sends position information of the train to the railside resource manager WRC, and sends railside resource application and releasing information to the railside resource manager WRC according to an operation plan, the railside resource manager WRC sends train sequence information, resource allocation and recovery information, and line device state information to the train-mounted subsystem CC, and the railside resource manager WRC can further send position information of a fault train to the adjacent train.

Preferably, the railside resource manager WRC is connected to the object controller OC by a wireless network interface ITF3.

The railside resource manager WRC sends a railside device driving command to the object controller OC, and the object controller OC feeds back a railside device state to the railside resource manager WRC.

Preferably, the adjacent train-mounted subsystems CC are in communication connection by a wireless network interface ITF4.

The train-mounted subsystem CC and a train-mounted subsystem CC of the adjacent train send position information of the trains and actively calculated operation range information to each other.

Preferably, the train-mounted subsystem CC is connected to the query transponder by a wireless network interface ITF5.

The train-mounted subsystem CC reads a message of the query transponder to implement absolute positioning information of the train.

Preferably, the automatic train supervision system ATS is connected to the railside resource manager WRC by a wireless network interface ITF6.

The automatic train supervision system ATS sends a railside device control command and information about the train operation plan to the railside resource manager WRC.

Preferably, the railside resource manager WRC is connected to the tag reader subsystem by a wireless network interface ITF7.

The railside resource manager WRC obtains position information of the train detected by the tag reader subsystem, and after the train-mounted subsystem CC fails, the tag reader subsystem installed on the train can still read a tag on a line, to detect a position of the train.

Preferably, the railside resource manager WRC is connected to the query transponder by a wireless network interface ITF8.

The query transponder reads a transponder ID on a line, and directly sends information about the transponder ID to the railside resource manager WRC, to implement position detection of a fault train.

A method used for the train autonomous control system based on train-to-train communication is provided, the method including following steps:

(1) applying, by trains, to a WRC for railside resources according to an operation plan;
(2) after receiving resource applications, determining, by the WRC, rationality of the resource applications, rejecting the applications if the resource applications are illegal, and storing the resource applications in an application list if the applications are legal, and entering a resource allocation processing link;
(3) determining whether the requested resources are in an unallocated state, entering step (5) if the resources are not allocated; otherwise, entering a resource conflict determining link and performing step (4);
(4) rejecting the request if the requested resources conflict with current allocation states of the resources, otherwise, entering step (5);
(5) determining whether the requested resources are consistent with current resource states, and entering step (6) if the request resources are not consistent with the current resource states; otherwise, entering step (7);
(6) outputting, by the WRC, a railside device driving command to an OC according to requested resource states;
(7) allocating the resources after railside device states is consistent with the requested resource states;
(8) feeding back, by the WRC, resource allocation states to the trains; and
(9) applying, by a CC, to the WRC for releasing the resources when the trains no longer need the resources.

Compared with the prior art, the present invention has the following advantages:

(1) the WRC in the train control system based on train-to-train communication is responsible for managing allocation and recovery of entire resources, performs conflict management on a train resource request, to ensure that allocation is not performed for a conflict resource request and ensure safety of the system, and simultaneously responds to resource requests that are from different trains and that have no conflict, to improve efficiency of the system;
(2) the system needs to dispose only a set of WRC devices on an entire line, without involving processing of cross-WRC control region, thereby simplifying a railside interface and information exchange;
(3) as a backup of a fault train, the WRC is responsible for taking over the fault train and applies for a resource and exchanges information with an adjacent train as a substitution of the fault train, thereby reducing impact of the fault train on a communication train;
(4) an interface is not required between the OC and the OC in the train control system based on train-to-train communication, thereby avoiding horizontal transmission of data;
(5) the tag reader subsystem can detect a position of the train, after the vehicle-mount subsystem CC fails, the tag reader subsystem can correctly recognize train information in a region in which the fault train is located and upload position information of the train to the WRC, and the WRC tracks the position of the fault train; and
(6) without disposing the tag reader system, when the train-mounted subsystem CC fails, information about a transponder interval in which the fault train is located can be recognized by using a transponder on the line, and is uploaded to the WRC, and the WRC tracks the position of the fault train.

DESCRIPTION OF THE EMBODIMENTS

Clear and complete description will be made to the technical solutions in embodiments of the present invention in conjunction with drawings in the embodiments of the present invention hereafter. Obviously, the described embodiments are merely a part of embodiments of the present invention and not all the embodiments. Based on the embodiments of the present invention, all of other embodiments obtained by a person of ordinary skill in the art without any creative effort shall belong to the protection scope of the present invention.

In the present invention, a train autonomous control system (TACS) based on train-to-train communication is provided with a set of railside resource managers (WRC) on an entire line based on train-to-train communication, the railside resource manager is responsible for managing railside resource allocation. Therefore, a quantity of railside devices is greatly reduced, an interface between systems is simplified, a transmission path of data information is reduced, and operation efficiency of the system is improved. In addition, system maintenance and implementation workloads are greatly reduced, and the cost of a product life cycle is reduced. In addition, when a train fails, the WRC is responsible for taking over the fault train and continues to maintain position information and external interfaces of the fault train without causing degraded operation of a communication train, thereby reducing impact of a fault on the operation.

In the TACS based on train-to train communication, with a train-mounted subsystem as a core, the train-mounted subsystem plans an operation path according to a received operation task plan, to determine railside resources that need to be used within an operation range, and applies to the WRC for the required railside resources. After obtaining the resources allocated by the WRC, the train-mounted subsystem autonomously controls a train to operate, and after the train-mounted subsystem no longer needs the resources, the train-mounted subsystem actively initiates an application for releasing the resources; and the train obtains position and operation range information of an adjacent train by directly communicating with the adjacent train, and actively calculates a movement authorization required for the operation without switching through a railside device, thereby reducing a transmission link of data information over a network and improving operation efficiency of the system.

Figure 1:
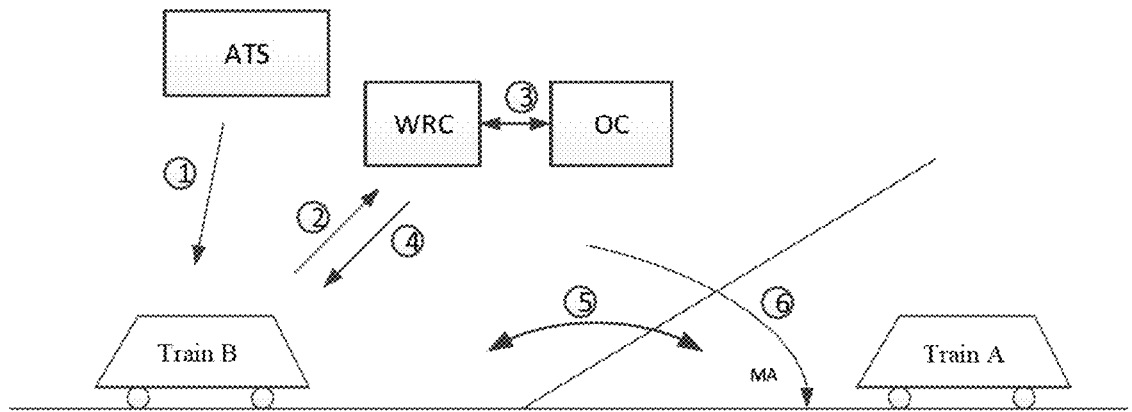
FIG. 1 is a work schematic flowchart of the present invention.

A work process of the TACS based on train-to-train communication is shown in FIG. 1:

(1) delivering, by an ATC, an operation task plan to a train B;
(2) planning, by the train B, an operation path according to the received operation task plan, and sending a railside resource application to a railside resource manager (WRC) according to the operation path;
(3) outputting, by the WRC, a railside device driving command to an object controller (OC) and receiving a device state;
(4) returning, by the WRC, a resource allocation state to the train B;
(5) exchanging, by the train B, a position and an operation range with an adjacent train A; and
(6) actively calculating, by the train B, a movement authorization (MA) according to an allocated resource and the operation range of the adjacent train, to implement autonomous operation of the train.

Figure 2:
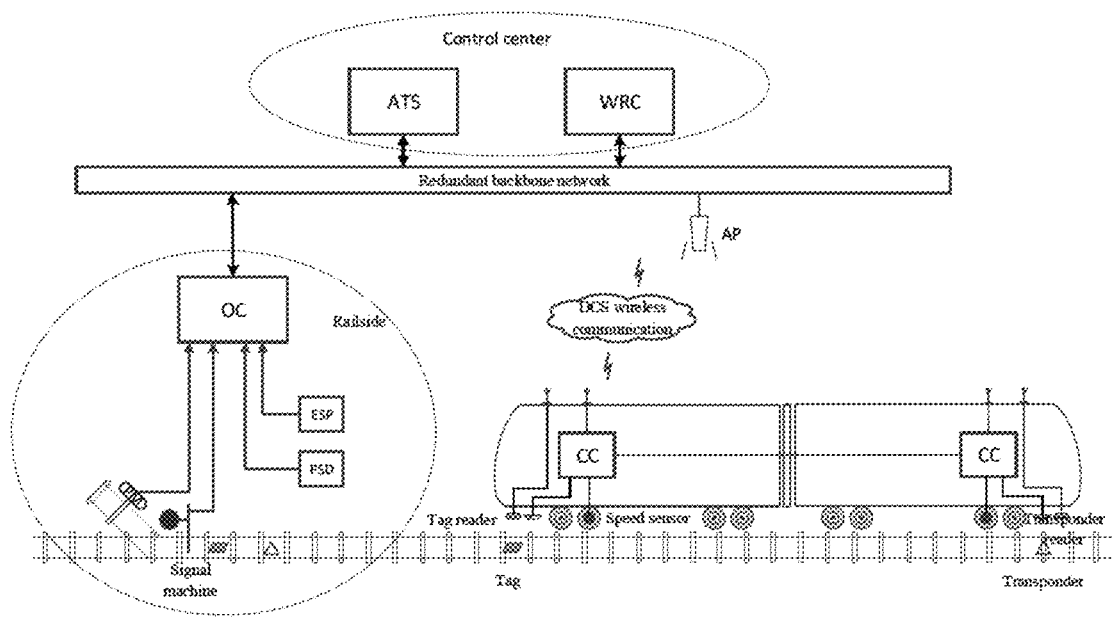
FIG. 2 is a schematic structural diagram of the present invention.

As shown in FIG. 2, the TACS based on train-to-train communication includes an automatic train supervision system ATS, a railside resource manager WRC, an object controller OC, a train-mounted subsystem CC, a tag reader subsystem, a query transponder, and a data communication system DCS. The ATS is responsible for supervision and controlling operation of a train and has functions of train tracking operation, alarm and event report, operation adjustment, operation control, and the like; the WRC is responsible for allocation and recovery of railside resources, train sequence management, train position information maintenance, and the like; the OC is responsible for railside device driving and state collection; the CC is responsible for train position calculation, train path planning, railside resource application and releasing, active calculation of a train MA, and the like; the tag reader subsystem is responsible for train position detection; the query transponder is responsible for providing information about a transponder ID to determine an absolute position of the train in the line; and the DCS implements communication between railside devices by using a redundant wired backbone network and implements two-way real-time communication between a train and a ground device and between a train and a train through a wireless network.

Figure 3:
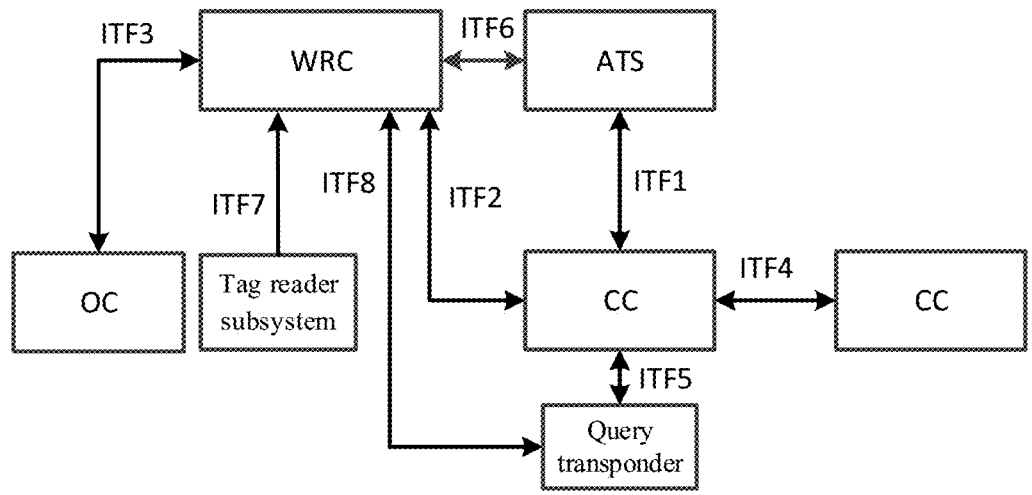
FIG. 3 is a schematic interface diagram of the present invention.

Interfaces among subsystems of the TACS based on train-to-train communication are shown in FIG. 3. The CC periodically sends position information of a train to the ATS by using a wireless network interface ITF1, and the ATS sends a train operation plan, manual adjustment information, and the like to the CC; the CC sends the position information of the train to the WRC by using a wireless network interface ITF2 and sends railside resource application and releasing information to the WRC according to the operation plan, and the WRC sends train sequence information, resource allocation and recovery information, and line device state information to the CC, and the WRC can further send position information of a fault train to an adjacent train; the WRC sends a railside device driving command to the OC by using a redundant backbone network interface ITF3, and the OC feeds back a railside device state to the WRC; the CC and a CC of the adjacent train send position information of the trains and actively calculated operation range information to each other by using a wireless network interface ITF4; the CC reads a message of the transponder by using a wireless network interface ITF5 to implement absolute positioning information of the train; the ATS sends a railside device control command and information about the train operation plan to the WRC by using a redundant backbone network interface ITF6; the WRC obtains the position information of the train detected by the tag reader subsystem by using a wireless network interface ITF7, and when the CC fails, the tag reader subsystem installed on the train can still read a tag on a line, to detect a position of the train; and if the tag reader subsystem is not disposed on the line, when the CC fails, position detection of the fault train may be also implemented by using position information of the transponder on the line, that is, the query transponder reads a transponder ID on the line by using an interface ITF8, and directly sends information about the transponder ID to the WRC, to implement position detection of the fault train.

SPECIFIC EMBODIMENTS

Figure 4:
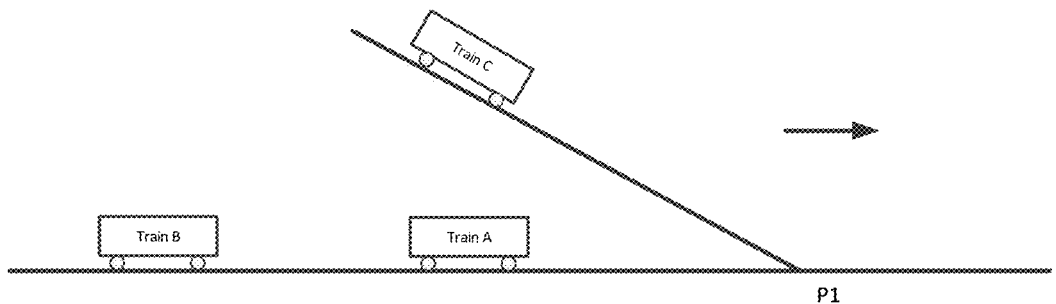
FIG. 4 is a schematic diagram of a mainline operation of a train.
Figure 5:
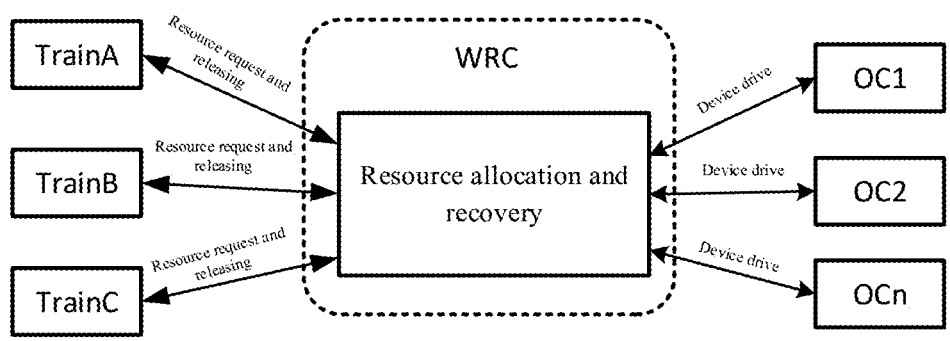
FIG. 5 is a schematic diagram of allocation and recovery processing of a railside resource of the present invention.
Figure 6:
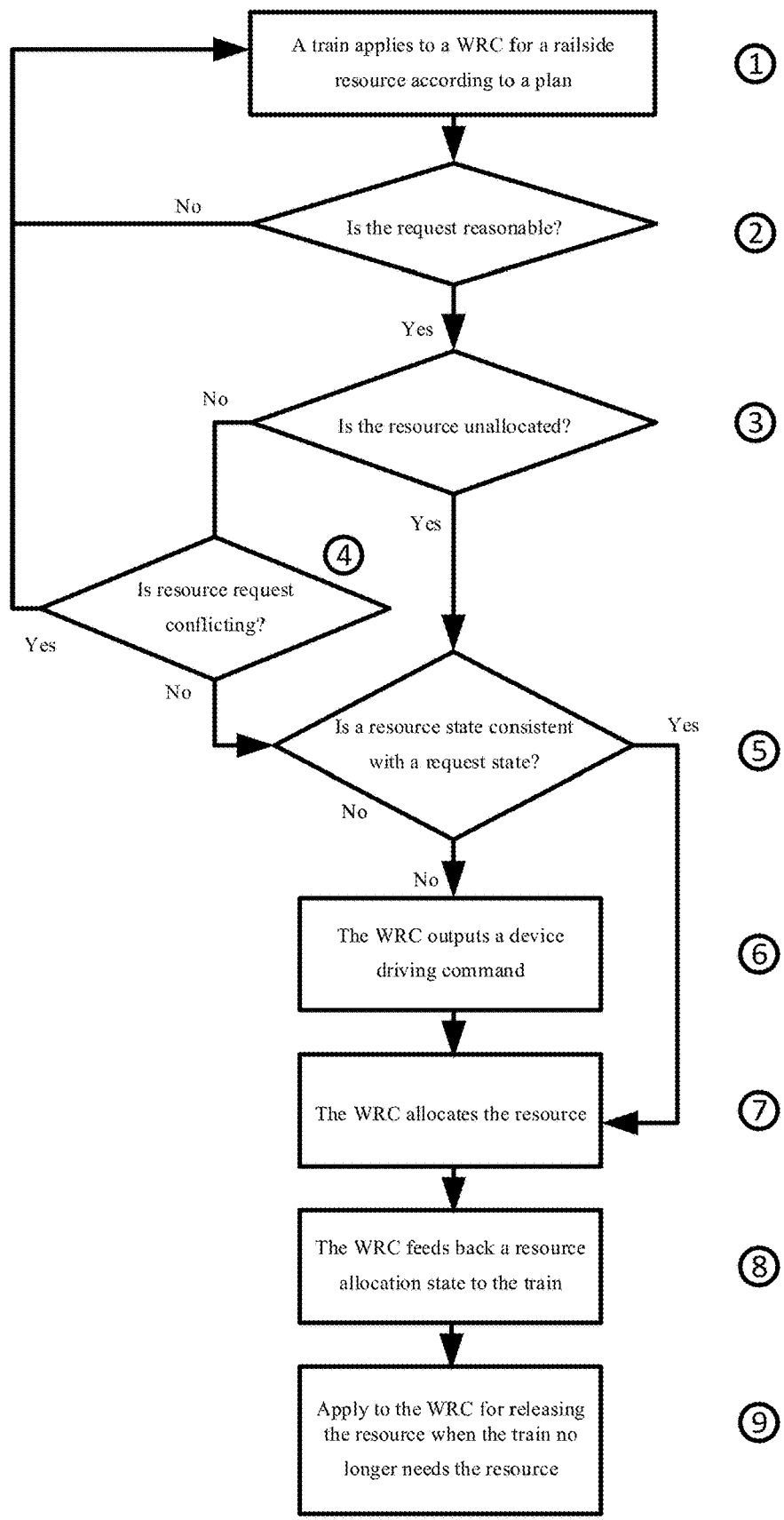
FIG. 6 is a flowchart of allocation and recovery of a railside resource of the present invention.

In the TACS based on train-to-train communication, railside resource request and allocation is key content. When trains A, B, and C runs to a turnout P1 according to an operation plan of the ATS (as shown in FIG. 4), the trains A, B, and C send applications of turnout P1 resources to the WRC in sequence (as shown in FIG. 5), and after receiving the applications of the trains, the WRC outputs a railside device driving command to the OC according to the resource applications, to allocate the railside resources. A work process of a detailed resource allocation process is shown in FIG. 6:

(1) applying, by trains, to a WRC for railside resources according to an operation plan;
(2) after receiving resource applications, determining, by the WRC, rationality of the resource applications, rejecting the applications if the resource applications are illegal, and storing the resource applications in an application list if the applications are legal, and entering a resource allocation processing link;
(3) determining whether the requested resources are in an unallocated state, entering step (5) if the resources are not allocated; otherwise, entering a resource conflict determining link;
(4) rejecting the requests if the requested resources conflict with current allocation states of the resources, otherwise, entering step (5);
(5) determining whether the requested resources are consistent with current resource states, and entering step (6) if the request resources are not consistent with the current resource states; otherwise, entering step (7);
(6) outputting, by the WRC, a railside device driving command to an OC according to requested resource states;
(7) allocating the resources after railside device states are consistent with the requested resource states;
(8) feeding back, by the WRC, resource allocation states to the trains; and
(9) applying, by a CC, to the WRC for releasing the resources when the trains no longer need the resources.

Figure 7:
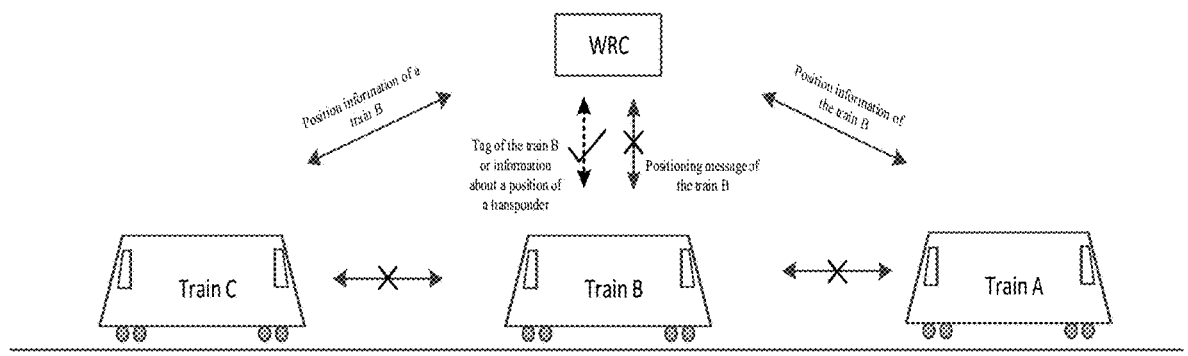
FIG. 7 is a schematic diagram of processing a fault train of the present invention.

In the TACS based on train-to-train communication, the processing after the train fails is also important content. As shown in FIG. 7, trains A, B, and C run on a mainline in sequence, when the train B fails, a CC of the train B lost communication with another device, a CC of the train A and a CC of the train C cannot directly communicate with the CC of the train B, but a tag reader or a query transponder on the train B can still detect a tag or transponder information on a line and can continue to send position information of the train B occupying a line segment to a WRC, and the WRC continues to maintain an operation state of the fault train, position information of the train, and information about an adjacent train with reference to the tag or the position information of the transponder uploaded by the CC of the train B before a fault occurs, and receives a train operation task of an ATS, performs resource application and releasing processing, and sends position and operation range information of the fault train to the adjacent train as a substitution of the CC of the fault train without causing degradation of the communication train and only affecting an operable range of a communication range, thereby reducing impact of the fault train on the communication train, and improving availability of the system.

The above descriptions are only specific implementations of the present invention. However, the protection scope of the present invention is not limited thereto, any person skilled in the art can easily think of various equivalent modifications or substitutions within the technical scope disclosed by the present invention, and all of these modifications or substitutions shall fall within the protection scope of the present invention. Therefore, the protection scope of the present invention should be determined with reference to the appended claims.

What is claimed is:

1. A train autonomous control system based on train-to-train communication, comprising an automatic train supervision system ATS, an object controller OC, a train-mounted subsystem CC, a tag reader subsystem, a query transponder, and a data communication system DCS, wherein the automatic train supervision system ATS is connected to the train-mounted subsystem CC, and the train-mounted subsystems CC of adjacent trains are in communication connection with each other, and the control system further comprises a railside resource manager WRC, and the railside resource manager WRC is respectively connected to the automatic train supervision system ATS, the train-mounted subsystem CC, the object controller OC, the tag reader subsystem, and the query transponder; and
    the train-mounted subsystem CC plans an operation path according to a received operation task plan, and applies to the railside resource manager WRC for required railside resources, after obtaining the resources allocated by the WRC, the train-mounted subsystem CC autonomously controls a train to operate, and after the train-mounted subsystem CC no longer needs the resources, the train-mounted subsystem CC actively initiates an application for releasing the resources; and the train obtains position and operation range information of an adjacent train by directly communicating with the adjacent train, and actively calculates a movement authorization required for the operation,
    wherein the train-mounted subsystem CC is connected to the railside resource manager WRC by a wireless network interface ITF2; and
    the train-mounted subsystem CC sends position information of the train to the railside resource manager WRC, and sends railside resource application and releasing information to the railside resource manager WRC according to an operation plan, the railside resource manager WRC sends train sequence information, resource allocation and recovery information, and line device state information to the train-mounted subsystem CC, and the railside resource manager WRC can further send position information of a fault train to the adjacent train.

2. The train autonomous control system based on train-to-train communication according to claim 1, wherein the train-mounted subsystem CC is connected to the automatic train supervision system ATS by a wireless network interface ITF1; and
    the train-mounted subsystem CC periodically sends position information of the train to the automatic train supervision system ATS, and the automatic train supervision system ATS sends a train operation plan and manual adjustment information to the train-mounted subsystem CC.

3. The train autonomous control system based on train-to-train communication according to claim 1, wherein the railside resource manager WRC is connected to the object controller OC by a wireless network interface ITF3; and
    the railside resource manager WRC sends a railside device driving command to the object controller OC, and the object controller OC feeds back a railside device state to the railside resource manager WRC.

4. The train autonomous control system based on train-to-train communication according to claim 1, wherein the adjacent train-mounted subsystems CC are in communication connection by a wireless network interface ITF4; and
    the train-mounted sub-system CC and a train-mounted subsystem CC of the adjacent train send position information of trains and actively calculated operation range information to each other.

5. The train autonomous control system based on train-to-train communication according to claim 1, wherein the train-mounted subsystem CC is connected to the query transponder by a wireless network interface ITF5; and
    the train-mounted subsystem CC reads a message of the query transponder to implement absolute positioning information of the train.

6. The train autonomous control system based on train-to-train communication according to claim 1, wherein the automatic train supervision system ATS is connected to the railside resource manager WRC by a wireless network interface ITF6; and
    the automatic train supervision system ATS sends a railside device control command and information about the train operation plan to the railside resource manager WRC.

7. The train autonomous control system based on train-to-train communication according to claim 1, wherein the railside resource manager WRC is connected to the tag reader subsystem by a wireless network interface ITF7; and
    the railside resource manager WRC obtains position information of the train detected by the tag reader subsystem, and after the train-mounted subsystem CC fails, the tag reader subsystem installed on the train can still read a tag on a line, to detect a position of the train.

8. A method used for the train autonomous control system based on train-to-train communication according to claim 1, the method comprising the following steps:
    (1) applying, by trains, to a WRC for railside resources according to an operation plan;
    (2) after receiving resource applications, determining, by the WRC, rationality of the resource applications, rejecting the applications if the resource applications are illegal, and storing the resource applications in an application list if the applications are legal, and entering a resource allocation processing link;

(3) determining whether the requested resources are in an unallocated state, entering step (5) if the resources are not allocated; otherwise, entering a resource conflict determining link and performing step (4);
(4) rejecting the requests if the requested resources conflict with current allocation states of the resources, otherwise, entering step (5);
(5) determining whether the requested resources are consistent with current resource states, and entering step (6) if the request resources are not consistent with the current resource states; otherwise, entering step (7);
(6) outputting, by the WRC, a railside device driving command to an OC according to the requested resource states;
(7) allocating the resources after railside device states are consistent with the requested resource states;
(8) feeding back, by the WRC, resource allocation states to the trains; and
(9) applying, by a CC, to the WRC for releasing the resources when the trains no longer need the resources.

9. A train autonomous control system based on train-to-train communication, comprising an automatic train supervision system ATS, an object controller OC, a train-mounted subsystem CC, a tag reader subsystem, a query transponder, and a data communication system DCS, wherein the automatic train supervision system ATS is connected to the train-mounted subsystem CC, and the train-mounted subsystems CC of adjacent trains are in communication connection with each other, and the control system further comprises a railside resource manager WRC, and the railside resource manager WRC is respectively connected to the automatic train supervision system ATS, the train-mounted subsystem CC, the object controller OC, the tag reader subsystem, and the query transponder; and
the train-mounted subsystem CC plans an operation path according to a received operation task plan, and applies to the railside resource manager WRC for required railside resources, after obtaining the resources allocated by the WRC, the train-mounted subsystem CC autonomously controls a train to operate, and after the train-mounted subsystem CC no longer needs the resources, the train-mounted subsystem CC actively initiates an application for releasing the resources; and the train obtains position and operation range information of an adjacent train by directly communicating with the adjacent train, and actively calculates a movement authorization required for the operation,
wherein the railside resource manager WRC is connected to the query transponder by a wireless network interface ITF8; and
the query transponder reads a transponder ID on a line, and directly sends information about the transponder ID to the railside resource manager WRC, to implement position detection of a fault train.

10. The train autonomous control system based on train-to-train communication according to claim 9, wherein the train-mounted subsystem CC is connected to the automatic train supervision system ATS by a wireless network interface ITF1; and
the train-mounted subsystem CC periodically sends position information of the train to the automatic train supervision system ATS, and the automatic train supervision system ATS sends a train operation plan and manual adjustment information to the train-mounted subsystem CC.

11. The train autonomous control system based on train-to-train communication according to claim 9, wherein the train-mounted subsystem CC is connected to the railside resource manager WRC by a wireless network interface ITF2; and
the train-mounted subsystem CC sends position information of the train to the railside resource manager WRC, and sends railside resource application and releasing information to the railside resource manager WRC according to an operation plan, the railside resource manager WRC sends train sequence information, resource allocation and recovery information, and line device state information to the train-mounted subsystem CC, and the railside resource manager WRC can further send position information of a fault train to the adjacent train.

12. The train autonomous control system based on train-to-train communication according to claim 9, wherein the railside resource manager WRC is connected to the object controller OC by a wireless network interface ITF3; and
the railside resource manager WRC sends a railside device driving command to the object controller OC, and the object controller OC feeds back a railside device state to the railside resource manager WRC.

13. The train autonomous control system based on train-to-train communication according to claim 9, wherein the adjacent train-mounted subsystems CC are in communication connection by a wireless network interface ITF4; and
the train-mounted sub-system CC and a train-mounted subsystem CC of the adjacent train send position information of trains and actively calculated operation range information to each other.

14. The train autonomous control system based on train-to-train communication according to claim 9, wherein the train-mounted subsystem CC is connected to the query transponder by a wireless network interface ITF5; and
the train-mounted subsystem CC reads a message of the query transponder to implement absolute positioning information of the train.

15. The train autonomous control system based on train-to-train communication according to claim 9, wherein the automatic train supervision system ATS is connected to the railside resource manager WRC by a wireless network interface ITF6; and
the automatic train supervision system ATS sends a railside device control command and information about the train operation plan to the railside resource manager WRC.

16. The train autonomous control system based on train-to-train communication according to claim 9, wherein the railside resource manager WRC is connected to the tag reader subsystem by a wireless network interface ITF7; and
the railside resource manager WRC obtains position information of the train detected by the tag reader subsystem, and after the train-mounted subsystem CC fails, the tag reader subsystem installed on the train can still read a tag on a line, to detect a position of the train.

17. A method used for the train autonomous control system based on train-to-train communication according to claim 9, the method comprising the following steps:
(1) applying, by trains, to a WRC for railside resources according to an operation plan;
(2) after receiving resource applications, determining, by the WRC, rationality of the resource applications, rejecting the applications if the resource applications are illegal, and storing the resource applications in an application list if the applications are legal, and entering a resource allocation processing link;

(3) determining whether the requested resources are in an unallocated state, entering step (5) if the resources are not allocated; otherwise, entering a resource conflict determining link and performing step (4);
(4) rejecting the requests if the requested resources conflict with current allocation states of the resources, otherwise, entering step (5);
(5) determining whether the requested resources are consistent with current resource states, and entering step (6) if the request resources are not consistent with the current resource states; otherwise, entering step (7);
(6) outputting, by the WRC, a railside device driving command to an OC according to the requested resource states;
(7) allocating the resources after railside device states are consistent with the requested resource states;
(8) feeding back, by the WRC, resource allocation states to the trains; and
(9) applying, by a CC, to the WRC for releasing the resources when the trains no longer need the resources.

* * * * *